United States Patent
Abe et al.

(10) Patent No.: US 7,382,746 B2
(45) Date of Patent: Jun. 3, 2008

(54) TRANSPORT CHANNEL SELECTING APPARATUS AND THE SELECTING METHOD

(75) Inventors: Tomoyuki Abe, Kawasaki (JP); Toshiyuki Yokosaka, Kawasaki (JP); Kazuto Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 10/871,262

(22) Filed: Jun. 18, 2004

(65) Prior Publication Data
US 2005/0135400 A1 Jun. 23, 2005

(30) Foreign Application Priority Data
Dec. 17, 2003 (JP) .............................. 2003-420079

(51) Int. Cl.
*H04Q 7/00* (2006.01)
(52) U.S. Cl. ...................... 370/329; 370/335; 370/338; 370/441; 370/433; 370/478
(58) Field of Classification Search ............. 370/310.1, 370/310.2, 320, 322, 328–330, 338, 348, 370/340–343, 478, 395.1, 335, 431–444; 709/200, 230, 232, 227; 455/464, 509, 450–453
See application file for complete search history.

(56) References Cited

U.S. PATENT DOCUMENTS

| 2002/0085531 | A1* | 7/2002 | Herrmann et al. .......... 370/338 |
| 2002/0136181 | A1 | 9/2002 | Belaiche et al. |
| 2004/0233899 | A1* | 11/2004 | Vayanos et al. ............ 370/328 |
| 2004/0254974 | A1* | 12/2004 | Khamfallah ................ 709/200 |
| 2006/0198303 | A1* | 9/2006 | Iacono et al. ............... 370/329 |

FOREIGN PATENT DOCUMENTS

| JP | 2002-232376 | 8/2002 |
| JP | 2003-046557 | 2/2003 |
| WO | 01/56314 | 8/2001 |

OTHER PUBLICATIONS

Japanese Office Action dated Jan. 15, 2008, from the corresponding Japanese Application.
European Search Report dated Feb. 8, 2008, from the corresponding European Application.
TSG-RAN: "Radio Interface Protocol Architecture for 3G Mobile System" 3GPP RAN TSG/WG2, No. 1, Jan. 15, 1999, pp. 1-30.

* cited by examiner

*Primary Examiner*—Doris To
*Assistant Examiner*—Ian N Moore
(74) *Attorney, Agent, or Firm*—Katten Muchin Rosenman LLP

(57) ABSTRACT

A transport channel selecting apparatus is provided, in which the transport channel selecting apparatus includes: a storage for storing information on combinations of transport blocks of transport channels to be transmitted to a radio base station; a transmission buffer for storing transport blocks of the transport channels; an address generation part for generating an address by using numbers of the transport blocks stored in the transmission buffer for each transport channel; an extraction part for extracting, from the storage, information on a combination of transport blocks of transport channels corresponding to the address; and a selection part for selecting transport blocks from the transmission buffer according to the combination indicated by the extracted information.

6 Claims, 12 Drawing Sheets

FIG.2A PRIOR ART

LIST OF TFC

| TFC | TrCH_A | TrCH_B | TrCH_C | TrCH_D |
|---|---|---|---|---|
| TFC NUMBER 0 | 0 | 0 | 0 | 1 |
| TFC NUMBER 1 | 0 | 0 | 1 | 0 |
| TFC NUMBER 2 | 0 | 1 | 0 | 0 |
| TFC NUMBER 3 | 1 | 0 | 0 | 0 |
| TFC NUMBER 4 | 1 | 1 | 1 | 1 |
| TFC NUMBER 5 | 2 | 2 | 1 | 1 |
| TFC NUMBER 6 | 0 | 0 | 0 | 0 |

FIG.2B PRIOR ART

TFC LIST TABLE

| ADDRESS | TFC | TrCH_A | TrCH_B | TrCH_C | TrCH_D |
|---|---|---|---|---|---|
| 000000 | TFC NUMBER 0 | 0 | 0 | 0 | 1 |
| 000001 | TFC NUMBER 1 | 0 | 0 | 1 | 0 |
| 000010 | TFC NUMBER 2 | 0 | 1 | 0 | 0 |
| 000011 | TFC NUMBER 3 | 1 | 0 | 0 | 0 |
| 000100 | TFC NUMBER 4 | 1 | 1 | 1 | 1 |
| 000101 | TFC NUMBER 5 | 2 | 2 | 1 | 1 |
| 000110 | TFC NUMBER 6 | 0 | 0 | 0 | 0 |

FIG.6

| TrCH | TRANSMISSION PRIORITY ORDER | MAXIMUM NUMBER OF BLOCKS |
|---|---|---|
| TrCH_A | A>B>C>D | 2 |
| TrCH_B | A>B>C>D | 2 |
| TrCH_C | A>B>C>D | 1 |
| TrCH_D | A>B>C>D | 1 |

FIG.7A

TFC LIST TABLE GENERATION DATA

| # | ADDRESS | TrCH_A | TrCH_B | TrCH_C | TrCH_D |
|---|---------|--------|--------|--------|--------|
| 1 | 000000 | 0 | 0 | 0 | 0 |
| 2 | 000001 | 0 | 0 | 0 | 1 |
| 3 | 000010 | 0 | 0 | 1 | 0 |
| 4 | 000011 | 0 | 0 | 1 | 1 |
| 5 | 000100 | 0 | 1 | 0 | 0 |
| 6 | 000101 | 0 | 1 | 0 | 1 |
| 7 | 000110 | 0 | 1 | 1 | 0 |
| 8 | 000111 | 0 | 1 | 1 | 1 |
| 9 | 001000 | 0 | 2 | 0 | 0 |
| 10 | 001001 | 0 | 2 | 0 | 1 |
| 11 | 001010 | 0 | 2 | 1 | 0 |
| 12 | 001011 | 0 | 2 | 1 | 1 |
| 13 | 010000 | 1 | 0 | 0 | 0 |
| 14 | 010001 | 1 | 0 | 0 | 1 |
| 15 | 010010 | 1 | 0 | 1 | 0 |
| 16 | 010011 | 1 | 0 | 1 | 1 |
| 17 | 010100 | 1 | 1 | 0 | 0 |
| 18 | 010101 | 1 | 1 | 0 | 1 |
| 19 | 010110 | 1 | 1 | 1 | 0 |
| 20 | 010111 | 1 | 1 | 1 | 1 |
| 21 | 011000 | 1 | 2 | 0 | 0 |
| 22 | 011001 | 1 | 2 | 0 | 1 |
| 23 | 011010 | 1 | 2 | 1 | 0 |
| 24 | 011011 | 1 | 2 | 1 | 1 |
| 25 | 100000 | 2 | 0 | 0 | 0 |
| 26 | 100001 | 2 | 0 | 0 | 1 |
| 27 | 100010 | 2 | 0 | 1 | 0 |
| 28 | 100011 | 2 | 0 | 1 | 1 |
| 29 | 100100 | 2 | 1 | 0 | 0 |
| 30 | 100101 | 2 | 1 | 0 | 1 |
| 31 | 100110 | 2 | 1 | 1 | 0 |
| 32 | 100111 | 2 | 1 | 1 | 1 |
| 33 | 101000 | 2 | 2 | 0 | 0 |
| 34 | 101001 | 2 | 2 | 0 | 1 |
| 35 | 101010 | 2 | 2 | 1 | 0 |
| 36 | 101011 | 2 | 2 | 1 | 1 |

FIG.7B

TFC LIST TABLE

| ADDRESS (b) | TFC | TrCH_A | TrCH_B | TrCH_C | TrCH D |
|---|---|---|---|---|---|
| 000000 | TFC NUMBER 6 | 0 | 0 | 0 | 0 |
| 000001 | TFC NUMBER 0 | 0 | 0 | 0 | 1 |
| 000010 | TFC NUMBER 1 | 0 | 0 | 1 | 0 |
| 000011 | TFC NUMBER 1 | 0 | 0 | 1 | 0 |
| 000100 | TFC NUMBER 2 | 0 | 1 | 0 | 0 |
| 000101 | TFC NUMBER 2 | 0 | 1 | 0 | 0 |
| 000110 | TFC NUMBER 2 | 0 | 1 | 0 | 0 |
| 000111 | TFC NUMBER 2 | 0 | 1 | 0 | 0 |
| 001000 | TFC NUMBER 2 | 0 | 1 | 0 | 0 |
| 001001 | TFC NUMBER 2 | 0 | 1 | 0 | 0 |
| 001010 | TFC NUMBER 2 | 0 | 1 | 0 | 0 |
| 001011 | TFC NUMBER 2 | 0 | 1 | 0 | 0 |
| 010000 | TFC NUMBER 3 | 1 | 0 | 0 | 0 |
| 010001 | TFC NUMBER 3 | 1 | 0 | 0 | 0 |
| 010010 | TFC NUMBER 3 | 1 | 0 | 0 | 0 |
| 010011 | TFC NUMBER 3 | 1 | 0 | 0 | 0 |
| 010100 | TFC NUMBER 3 | 1 | 0 | 0 | 0 |
| 010101 | TFC NUMBER 3 | 1 | 0 | 0 | 0 |
| 010110 | TFC NUMBER 3 | 1 | 0 | 0 | 0 |
| 010111 | TFC NUMBER 4 | 1 | 1 | 1 | 1 |
| 011000 | TFC NUMBER 3 | 1 | 0 | 0 | 0 |
| 011001 | TFC NUMBER 3 | 1 | 0 | 0 | 0 |
| 011010 | TFC NUMBER 3 | 1 | 0 | 0 | 0 |
| 011011 | TFC NUMBER 4 | 1 | 1 | 1 | 1 |
| 100000 | TFC NUMBER 3 | 1 | 0 | 0 | 0 |
| 100001 | TFC NUMBER 3 | 1 | 0 | 0 | 0 |
| 100010 | TFC NUMBER 3 | 1 | 0 | 0 | 0 |
| 100011 | TFC NUMBER 3 | 1 | 0 | 0 | 0 |
| 100100 | TFC NUMBER 3 | 1 | 0 | 0 | 0 |
| 100101 | TFC NUMBER 3 | 1 | 0 | 0 | 0 |
| 100110 | TFC NUMBER 3 | 1 | 0 | 0 | 0 |
| 100111 | TFC NUMBER 4 | 1 | 1 | 1 | 1 |
| 101000 | TFC NUMBER 3 | 1 | 0 | 0 | 0 |
| 101001 | TFC NUMBER 3 | 1 | 0 | 0 | 0 |
| 101010 | TFC NUMBER 3 | 1 | 0 | 0 | 0 |
| 101011 | TFC NUMBER 5 | 2 | 2 | 1 | 1 |

FIG.10

| TrCh | FIRST TRANSMISSION | | | | SECOND TRANSMISSION | | | | THIRD TRANSMISSION | | | |
|---|---|---|---|---|---|---|---|---|---|---|---|---|
| | TrCH A | TrCH B | TrCH C | TrCH D | TrCH A | TrCH B | TrCH C | TrCH D | TrCH A | TrCH B | TrCH C | TrCH D |
| TRANSMISSION BUFFER AMOUNT FOR EACH TrCh (Dec) | 3 | 3 | 2 | 1 | 1 | 1 | 2 | 1 | 0 | 0 | 1 | 0 |
| NUMBER OF BLOCKS OF EACH TrCH BEFORE CONNECTION (bin) | 10 | 10 | 1 | 1 | 01 | 01 | 1 | 1 | 00 | 00 | 1 | 0 |
| GENERATED ADDRESS (bin) | 101011 | | | | 010111 | | | | 000010 | | | |
| SELECTED TFC NUMBER | TFC NUMBER 5 | | | | TFC NUMBER 4 | | | | TFC NUMBER 1 | | | |
| NUMBER OF BLOCKS TRANSMITTED | 2 | 2 | 1 | 1 | 1 | 1 | 1 | 1 | 0 | 0 | 1 | 0 |

TRANSPORT CHANNEL SELECTING APPARATUS AND THE SELECTING METHOD

BACKGROUND OF THE INVENTION

1. Field of the Invention

The present invention generally relates to a technical field of mobile communications. More particularly, the present invention relates to a transport channel selecting apparatus and a transport channel selecting method for transmitting a predetermined combination of transport blocks of transport channels to a radio base station.

2. Description of the Related Art

In the technical field of the mobile communications, the IMT 2000 system has been developed as a next generation (third generation) mobile communications system and the IMT 2000 system is being standardized by 3GPP (3rd Generation Partnership Project) from requirements to realize high speed data communications that can provide mobile media services and to realize international global roaming services and the like.

FIG. 1 shows an overview of the mobile communications system. As shown in the figure, the mobile communications system 100 includes a user apparatus or a mobile terminal (UE) 102, a radio base station (or node B) 104 that communicates with the mobile terminal 102 by radio, a radio network control part (RNC) 106, and a core network (CN) 108 that communicates with the radio network control part 106 via wire lines. The radio network control part (RNC) 106 performs control of the radio base station 104, management of radio resources, control of hand over and the like. The core network 108 performs movement management of the mobile terminal 102, signaling, service control and the like. In the figure, Iu represents an interface between the core network 108 and the radio network control part 106, Iub represents an interface between the radio network control part 106 and the radio base station 104, and Uu represents an interface between the radio base station 104 and the mobile terminal 102.

From the viewpoint of protocol layers, the mobile communications system 100 is formed by, in an ascending order from the bottom layer, the physical layer (layer 1), the data link layer (layer 2) and the network layer (layer 3). Further, the layer 2 that mainly relates to operations of the radio network control part 106 includes a radio link control (RLC) layer and a medium access control (MAC) layer that is below the RLC layer. The RLC layer is for controlling operations of ARQ (automatic repeat request) and the like. Comminations between the layer 1 and the layer 2 are performed by "logical channel", and communications between the layer 2 and the layer 3 are performed by "transport channel (TrCH)". Such mobile communications system is disclosed in Japanese laid open patent application No.2003-46557 and "http://www.3 gpp.org/", for example.

In the mobile communications system, the mobile terminal 102 and the radio base station 104 are connected by radio, and resources (bandwidth) used for the communications between them are limited to a predetermined range. In addition, for using resources efficiently and for transmitting high priority information rapidly, types of transport channels and the number of transport blocks (or number of ATM cells) are limited to a predetermined combination, so that the predetermined combination of transport blocks is transmitted to the radio base station. As the high priority information, there is a paging channel (PCH) for example. As other transport channels, there are a notification channel (BCH : Broadcast channel) for transmitting information on radio base stations such as frequencies used by the radio base station and the like, an uplink common channel (RACH : Random Access Channel), a downlink common channel (FACH : Forward Access Channel), and a dedicated channels (DCH) and the like. In the channels, the paging channel (PCH) and the downlink common channel (FACH) are multiplexed and transmitted in a predetermined channel (S-CCPCH : Secondary Common Control Physical Channel) from the radio base station.

FIGS. 2A and 2B show tables indicating examples of combinations of transport channels (TFC: Transport Format Combination) transmitted from the RNC to the node B. For the sake of simplicity, although seven combinations (TFC number 0-6) for four kinds of transport channels (TrCH_A-D) are shown in the tables, other values can be taken according to usage. Each line in the table shown in FIG. 2A indicates a combination of numbers of transport blocks for each of transport channels. For example, the combination indicated by the TFC number: 0 indicates that data of the transport channels TrCH_A-C are not transmitted but one transport block of a transport channel TrCH_D is transmitted. In addition, the combination indicated by the TFC number: 5 indicates that transport blocks of transport channels TrCH_A-D are transmitted by two, two, one and one respectively. By transmitting a predetermined combination of the transport blocks, resources can be used efficiently. The information relating to the predetermined combinations is stored n a memory as a TFC list table as shown in FIG. 2B. If a combination of transport blocks of transport channels that is not included in the predetermined combinations is transmitted to the node B, it is not guaranteed that data of the channels are properly transmitted (for example, unintentional coding process may be performed, or data of the channels may be discarded).

When the radio network control part RNC 106 sends data received from an upper part to the node B and to the mobile terminal UE, the radio network control part RNC 106 transmits transport blocks of transport channels to the node B according the above-mentioned predetermined combination. In this case, for transmitting transport blocks of transport channels in a transmission buffer to the node B, the radio network control part RNC 106 selects a combination and transmits transport blocks corresponding to the combination such that the best transmission efficiency can be obtained. Therefore, the radio network control part RNC 106 may select an optimal combination by checking all combinations shown in FIG. 2A.

FIG. 3 shows a conventional flowchart for determining a combination of transport blocks of transport channels. In step 302, transport blocks of transport channels to be transmitted to the node B are stored in the transmission buffer in the RNC, and a transmission request arises.

In step 304, the RNC accesses the TFC list table. In the TFC list table as shown in FIG. 2B, predetermined combinations of numbers transport blocks of transport channels are stored.

In step 306, the RNC selects a combination (TFC) from the TFC list table. The selected TFC is treated as a new TFC hereinafter.

In step 308, the RNC determines whether the new TFC can be used for the transmission request. For example, if the TFC number 4 (FIG. 2B) is selected and if transport blocks of transport channels TrCH_B-D are stored in the transmission buffer but data of the TrCH_A is not stored in the transmission buffer in step 308, the TFC number 4 cannot be selected since one transport block of TrCH_A must be transmitted according to the TFC number 4, so that the step goes to step 314. On the other hand, if transport blocks of the transport channels can be transmitted, the step goes to step 310.

In step 310, transmission efficiency is determined between an old TFC that was previously selected and the new TFC. The transmission efficiency is determined according to the numbers of transport blocks or information amount that can be transmitted by one time transmission. If the transmission efficiency of the new TFC is lower than that of the old TFC, the step goes to step 314. If the transmission efficiency of the new TFC is not lower than that of the old TFC, the step goes to step 312.

In step 312, the old TFC is updated to the new TFC. In step 314, it is checked whether every TFC has been checked. If there exists any unchecked TFC, the step moves to the step 304 so that the above-mentioned procedure is repeated. If every TFC has been checked, the step goes to step 316.

In step 316, the old TFC is determined as the combination used for actually transmitting the transport blocks of transport channels, and the transmission is performed and the process ends.

The above-mentioned series of operations generally need much amount of time, so that there is a problem in that real time processing becomes difficult and the transmission efficiency becomes worse due to increase of waiting time and delay time. In addition, if selection of a proper TFC is delayed, the status in the transmission buffer may be changed while selecting a TFC based on the status of the transmission buffer, so that the determined TFC may not be a optimum combination. As to the problems, in the invention described in the Japanese laid open patent application No.2003-46557, to improve the method of selecting a combination, various specific pieces of data such as list selection calculation data are generated and the specific pieces of data are compared each other so that a proper combination is selected. However, also according to this method, a proper combination needs to be selected by checking all combinations for transmitting given transport channels to the radio base station. Thus, since generation of the pieces of data used for comparison and the comparison of the pieces of data may be delayed, the above-mentioned method is not effective.

SUMMARY OF THE INVENTION

An object of the present invention is to provide a selecting apparatus that can select a combination of transport blocks of transport channels in which good transmission efficiency is obtained from among a plurality of combinations when transmitting transport blocks of transport channels by multiplexing them in a radio section.

The above object is achieved by a transport channel selecting apparatus including:

a storage for storing information on combinations of transport blocks of transport channels to be transmitted to a radio base station;

a transmission buffer for storing transport blocks of the transport channels;

an address generation part for generating an address by using numbers of the transport blocks stored in the transmission buffer for each transport channel;

an extraction part for extracting, from the storage, information on a combination of transport blocks of transport channels corresponding to the address; and a selection part for selecting transport blocks from the transmission buffer according to the combination indicated by the extracted information.

According to the present invention, it becomes possible to select a combination of transport blocks of transport channels in which good transmission efficiency is obtained from among a plurality of combinations when transmitting transport blocks of transport channels to be multiplexed to a radio base station over a radio section.

BRIEF DESCRIPTION OF THE DRAWINGS

Other objects, features and advantages of the present invention will become more apparent from the following detailed description when read in conjunction with the accompanying drawings, in which:

FIG. 2A and FIG. 2B are tables showing predetermined combinations of transport blocks of transport channels transmitted from a RNC to a node B;

FIG. 6 is a table showing TFC list information;

FIGS. 7A and 7B are tables showing combinations of numbers of transport blocks of transport channels;

FIG. 10 shows an operation example for transmitting transport blocks of transport channels according to an embodiment of the present invention;

DETAILED DESCRIPTION OF THE PREFERRED EMBODIMENTS

In the following, embodiments of the present invention are described with reference to figures. In the description, the term "transport channel" is used broadly including not only meaning of the transport channel in the third generation standard but also meaning of channels generally used for transmission. In addition, the term "block" includes meaning of a unit of information to be transmitted, a group of pieces of information, a cluster of pieces of information and the like.

Figure 1:
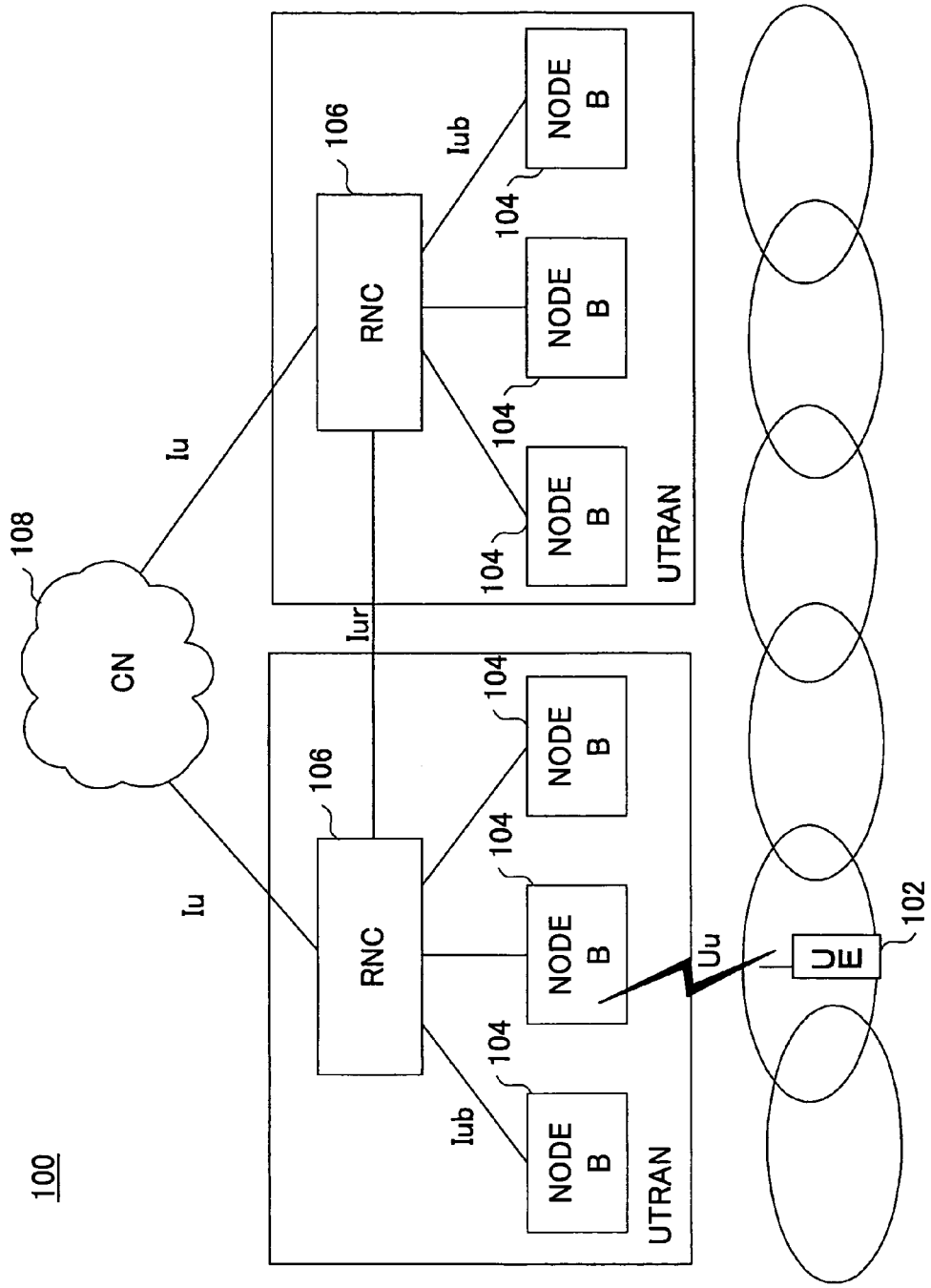
FIG. 1 shows an overview of a mobile communications system
Figure 3:
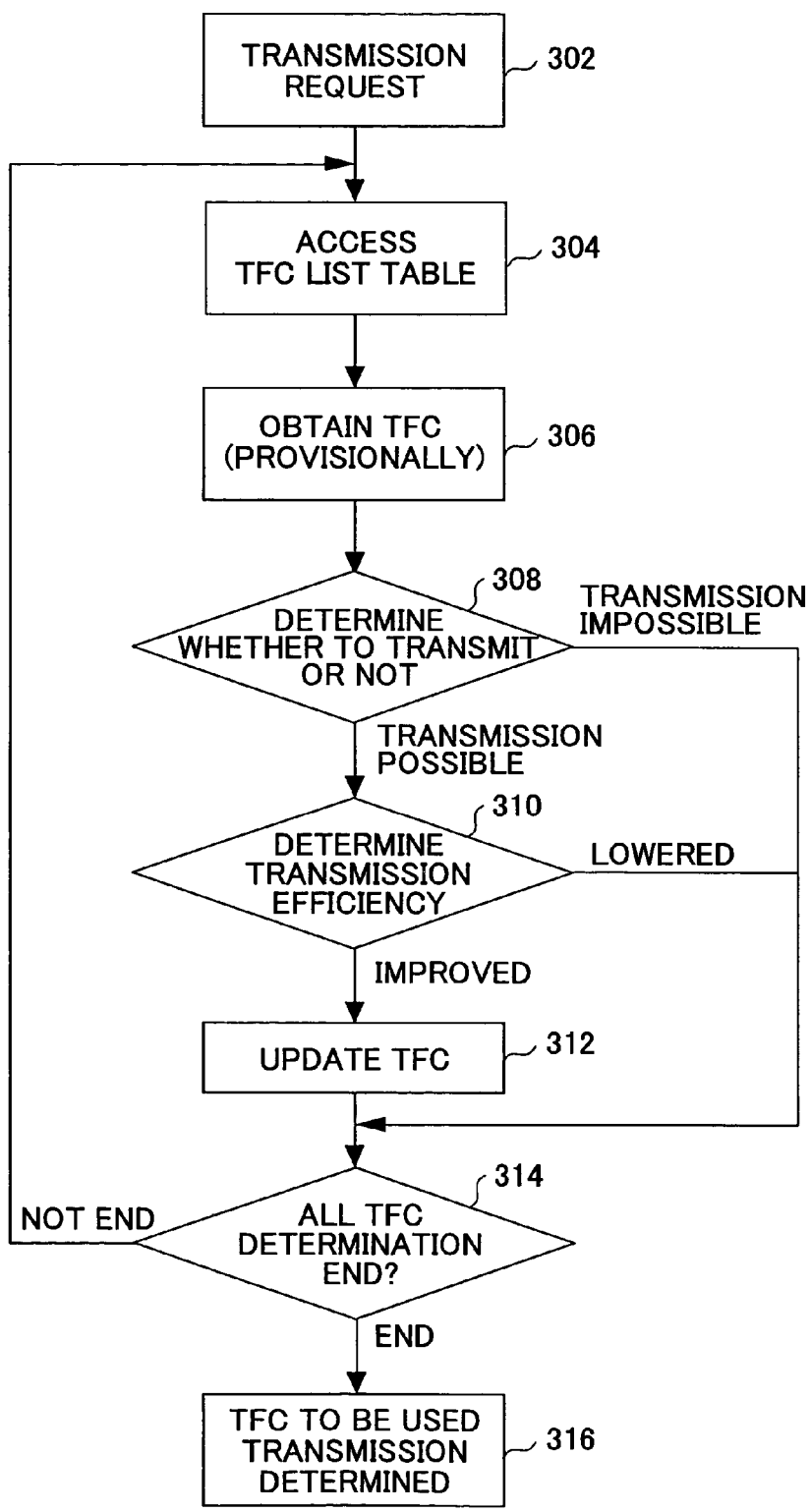
FIG. 3 shows a conventional flowchart for determining a combination of transport blocks of transport channels.
Figure 4:
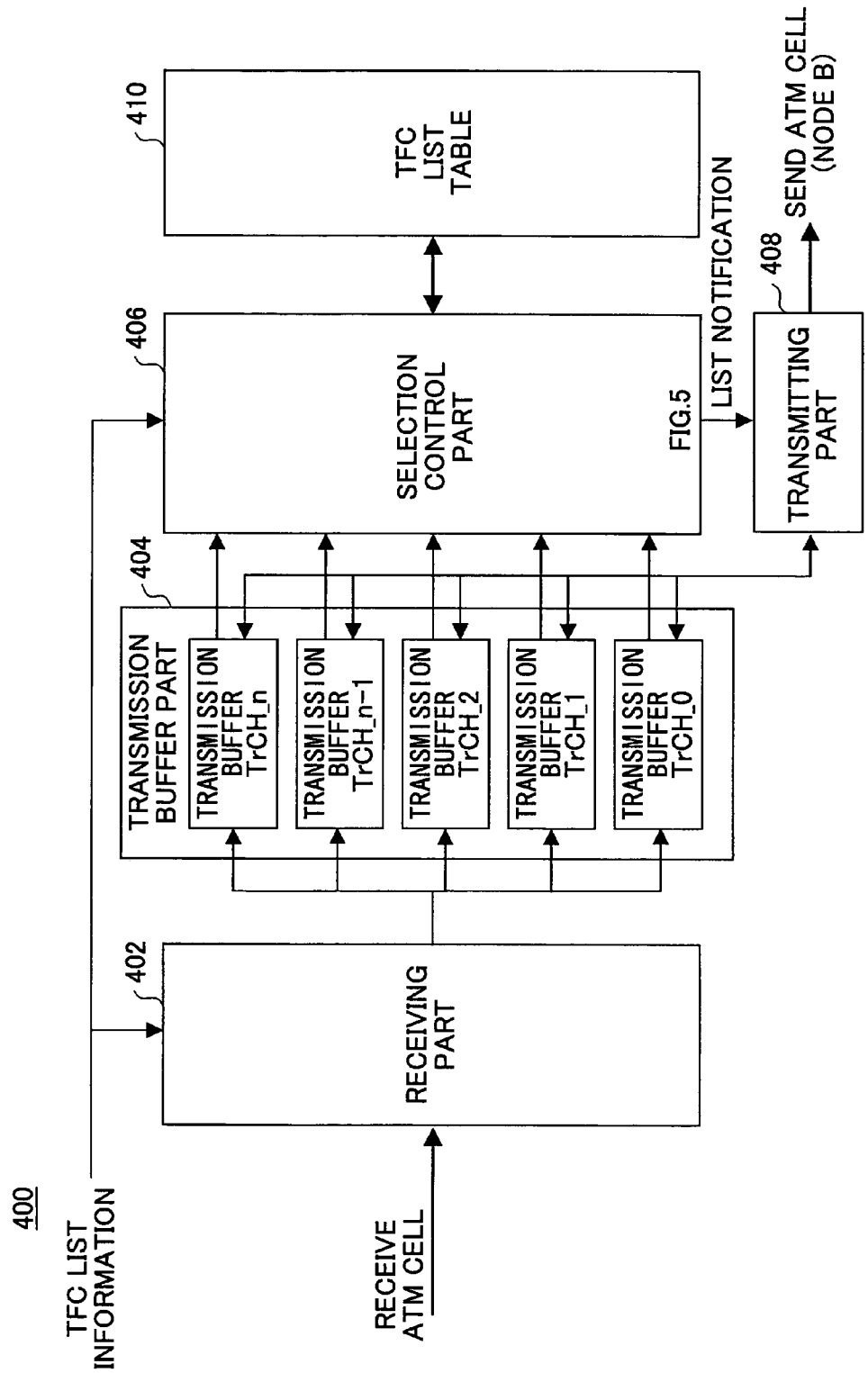
FIG. 4 is a block diagram showing a multiplexing part provided in the RNC according to an embodiment of the present invention.

FIG. 4 is a block diagram showing a multiplexing part provided in the RNC that transmits transport blocks of transport channels to the node B. Although the RNC includes various components for transmitting various kinds of transport channels to the node B, please note that FIG. 4 shows only components that specifically relates to the present invention. That is, FIG. 4 shows parts for processing transport channels such as the paging channel (PCH) or the downlink common channel (FACH) that are multiplexed and the multiplexed one is transmitted by radio.

The multiplexing part 400 includes a receiving part 402, a transmission buffer part 404, a selection control part 406 and a transmitting part 408 and a TFC list table 410.

The receiving part 402 receives, from upper components, transport blocks of predetermined transport channels to be transmitted to the node B. The received blocks of logical channels are formed by ATM cells indicating PCCH, BCCH, CCCH, DCCH, DTCH and the like. These channels are associated with transport channels such as the PCH and FACH and the like. The receiving part 402 determines types of received channels and stores the cells in the transmission buffer part 404 for each channel type (TrCH_1-TrCH_n).

The selection control part 406 selects a proper combination (TFC) from the TFC list table 410 according to the types of the transport channels and the number of the transport blocks (TB) stored in the transmission buffer part 404, and sends the combination or information indicating the combination to the transmitting part 408. Details of the selection control part 406 will be described with reference to FIG. 5. The relationship between the number of transport blocks and the number of ATM cells is properly determined according to usage of products.

The transmitting part 408 obtains transport blocks of transport channels from the transmission buffer 404 according to the notified combination and sends the transport blocks via the transport channels to the node B.

As mentioned later, the TFC list table 410 includes correspondences between various combinations derived by using maximum numbers of transport blocks for each of transport channels and predetermined combinations actually used for transmission.

Figure 5:
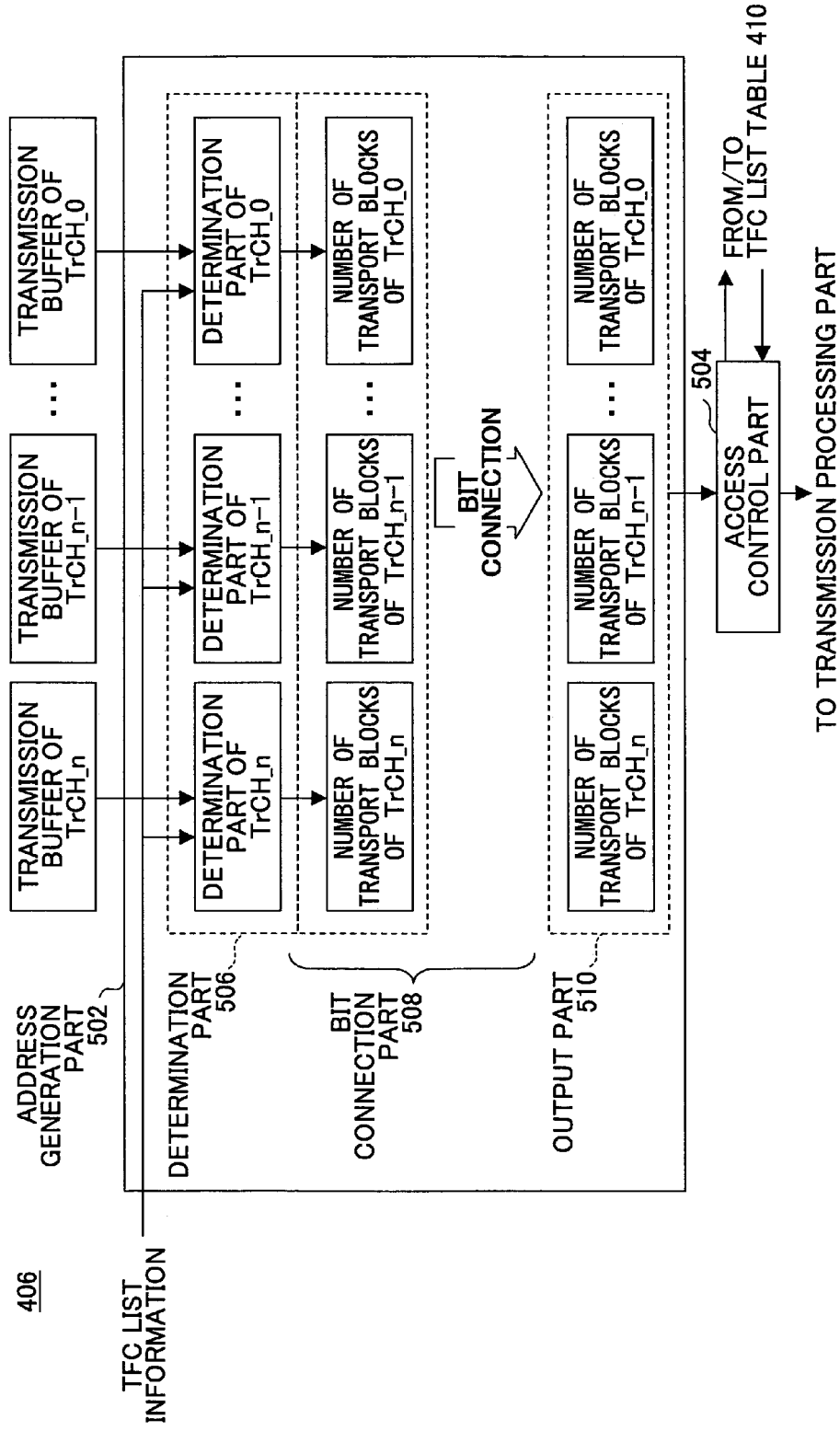
FIG. 5 is a block diagram of a selection control part 406 shown in FIG. 4.

FIG. 5 shows a block diagram of the selection control part 406 of FIG. 4. The selection control part 406 includes an address generation part 502 and an access control part 504. The address generation part 502 includes a determination part 506, a bit connection part 508 and an output part 510.

The determination part 506 compares the number of transport blocks stored in the transmission buffer with the maximum number of the transport blocks for each type of transport channels, and outputs smaller one. Information of the maximum number of the transport blocks are included in the TFC list information. As shown in FIG. 6, the TFC list information includes maximum numbers of the transport blocks, and information on priority of each transport channel type and the like.

The bit connection part 508 receives binary information indicating smaller one between the number of transport blocks stored in the transmission buffer and the maximum number of transport blocks for each transport channel. In addition, the bit connection part 508 connects binary information received for each transport channel type so as to form an address. Thus, the bit width of the address is the total sum of the numbers of bits each of which numbers is necessary for representing the maximum number of transport blocks for a corresponding transport channel type. For example, as shown in FIG. 6, assuming that there are four types of transport channels TrCH_A-D and the maximum block numbers for the channels are 2, 2, 1, 1 respectively, at lease two bits are necessary to represent decimal "2" in binary, and at lease one bit is necessary to represent decimal "1" in binary. Therefore, the bit width of the address generated in the bit connection part 508 is 6 bits (=2+2+1+1). In the case where the maximum numbers of the transport blocks are 5, 2, 8, 1 respectively, the necessary address width is 10 bits (=3+2+4+1).

The output part 510 outputs the address generated in the bit connection part 508 to the access control part 504.

The access control part 504 accesses the TFC list table 410 by using the address obtained from the address generation part 502, and extracts information corresponding to the address. The extracted information indicates a combination (TFC) to be actually used for transmitting data, and is sent to the transmission part 408.

The tables shown in FIGS. 7A and 7B indicate information on combinations of numbers of transmission blocks of transport channels. FIG. 7B indicates information included in the TFC list table 410. FIG. 7A is an expedient table for explaining processes for generating the table of FIG. 7B. As shown in FIG. 7A, all combinations available from the view point of maximum numbers of the transport blocks for each transport channel shown in FIG. 6 are listed. For example, as to TrCH_A and B, since the maximum number of transport blocks is 2, the number of transport blocks for each of the channels that are actually sent may be 0, 1 or 2. As to TrCH_C and D, since the maximum number of transport blocks is 1, the number of transport blocks that are actually sent may be 0 or 1. The table shows all combinations of numbers of transport blocks for TrCH_A-D. One line in the table indicates one combination of the numbers of transport blocks for the transport channels TrCH_A-D. Since total sum of the numbers of bits necessary for representing the maximum numbers of transport blocks : 2, 2, 1, 1 is 6 (=2+2+1+1), an address of 6 bit width is set. In this table, as to a combination (one line), a connection of binary representations of the numbers of transport blocks for TrCH_A-D is exactly the same as the address. For example, the combination of the numbers of transport blocks of the line number 7 is 0, 1, 1, 0 in the order of TrCH_A-D, which can be represented as 00, 01, 1, 0 in binary. The connection of the binary representations is "000110" which is the same as the address in the line 7. The line number is described in line indicated by "#" in the table.

Next, on the basis of the table in FIG. 7A and predetermined combinations (TFC), the table shown in FIG. 7B is generated. Each of combinations (line numbers 1-36) shown in FIG. 7A is associated with a combination (one of TFC number 0-6) that may be actually used for transmission shown in FIG. 2B. The association is performed in consideration of priority and transmission efficiency of transport channels on which transport blocks are transmitted. Although the association is performed in the following way for example, other method may be used.

As shown in FIG. 6, it is assumed that priority is lowered in a descending order of TrCH_A, B, C, D. First, the first address "000000" (or line number 1) is specified. The number of transport block of the highest priority channel TrCH_A is 0, and combinations (TFC numbers) that allow such transmission are selected, so that TFC numbers 0, 1, 2 and 6 are obtained. From the selected numbers, combinations that allow transmission of the number (0) of transport block of the next high priority channel TrCH_B are selected, so that TFC numbers 0, 1 and 6 are obtained. Further, combinations that allow transmission of the number (0) of blocks of TrCH_C is selected, so that TFC numbers 0 and 6 are obtained. Then, a combination that allows transmission of the number of transport blocks (0) of TrCH_D is selected, so that a TFC number 6 is obtained. Therefore, the address "000000" is associated with the TFC number 6. The association can be performed as to each combination that is the same as one combination of the TFC numbers 0-6 (line numbers 1, 2, 3, 5, 13, 20, 36).

However, any combination other than the above-mentioned combinations cannot be sent to the node B at a time. Even if the combination of transport blocks is sent, it is not assured that the transmission is performed properly. Therefore, the transport blocks of transport channels are split and transmitted a plurality of times. Also in this case, the highest priority channel should be transmitted first, and a TFC (combination) that improves the transmission efficacy as much as possible should be transmitted first. For example, as for the combination shown in the line number 4, a combination that allows transmission of transport blocks of TrCH_A-C is only TFC number 1, but the combination of the TFC number 1 does not allow transmission of one block of TrCH_D. Thus, in this case, transmission of the transport block of TrCH_D that has lower priority is postponed. Therefore, TFC number 1 is associated with the address of the line number 4. As to a combination indicated by the line number 9, combinations that allows the number (0) of transport block of TrCH_A corresponds TFC numbers 0, 1, 2 and 6. However, any combination of these does not allow transmission of two transport blocks of TrCH_B. Thus, in this case, the number of transport blocks of TrCH_B is decreased by one and a combination that allows transmission of one TrCH_B block is selected. As mentioned above, the address "001000" of line number 9 is associated with the TFC number 2. By performing the above-mentioned operations for every combination (each of line numbers 1-36), the table shown in FIG. 7B is generated, and is stored in the memory as the TFC list table 410. Although there are various methods for generating the TFC list table, the TFC list table can be easily generated by configuring the address generated by the address generation part 502 such that the address indicates the numbers of the transport blocks of transport channels in an order of transmission priority of the transport channels.

Each combination (line) of the numbers of transport blocks in the table in FIG. 7B is the same as one of the predetermined combinations (TFC number 0-6). Therefore, except for addresses corresponding to the line numbers 1, 2, 3, 5, 13, 20 and 36, the address and a binary number obtained by connecting the numbers of transport blocks of each transport channel are not the same. For example, the combination of the numbers of transport blocks indicated by the line number 7 is 0, 1, 0, 0 in the order of TrCH_A-D. Thus, "000100" is obtained by representing each number in binary and connecting them. But, "000100" is different from the address "000110" of the line number 7. Therefore, in the table shown in FIG. 7B, one of the predetermined combinations used for actual transmission is associated with each address other than the address that corresponds to one of the predetermined combinations. That is, in this table, the number of addresses that are associated with the predetermined combinations is larger than the number of the predetermined combinations.

Figure 8:
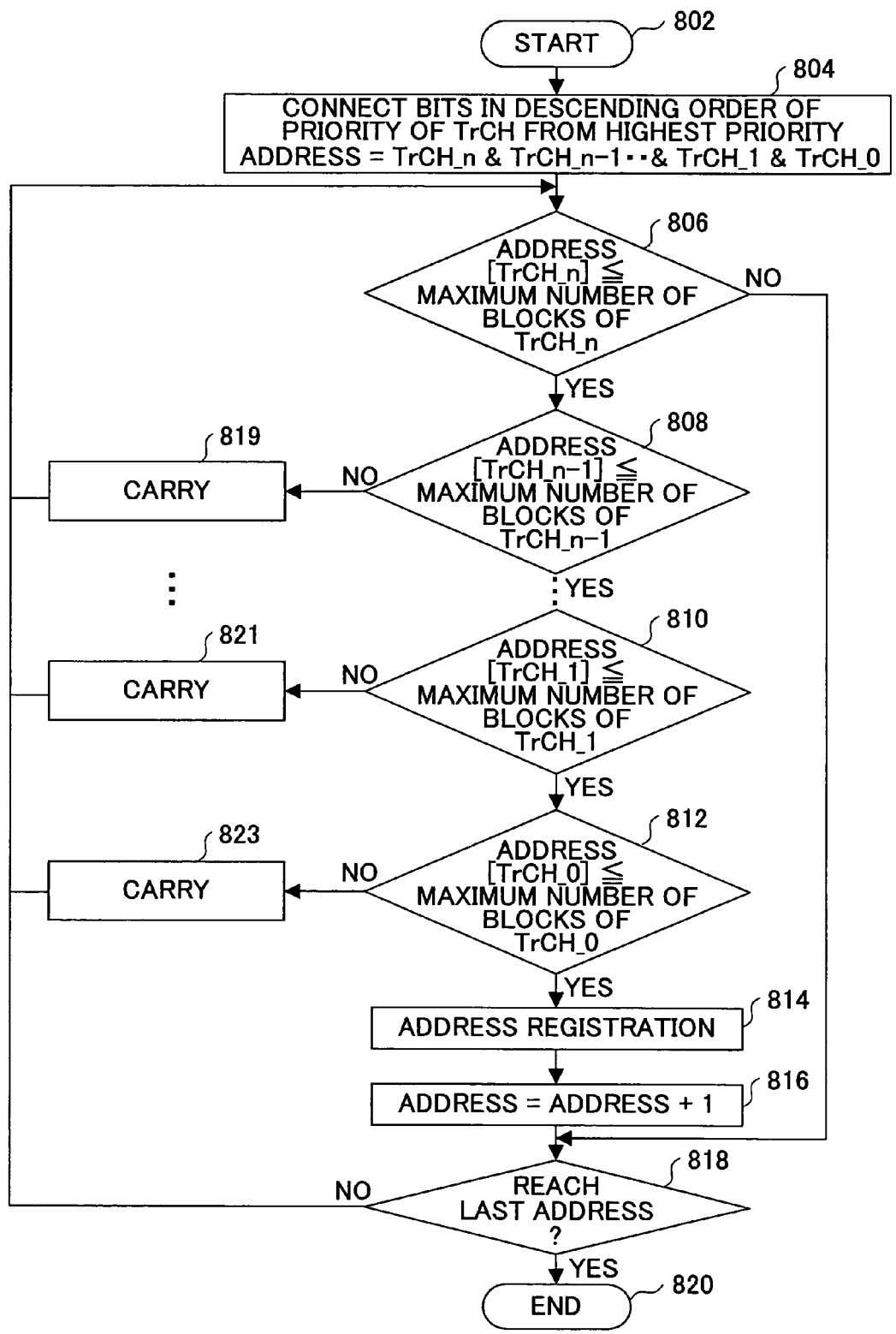
FIG. 8 is a flowchart that can be used for generating necessary addresses in a table shown in FIG. 7A.

FIG. 8 is a flowchart that can be used for generating the table shown in FIG. 7A. More specifically, the flowchart shows the procedure for generating the addresses one by one in the table shown in FIG. 7A. The flowchart starts from step 802 and goes to step 804.

In step 804, an address (Address) is generated by connecting binary representations (Address[TrCH_x]) of the numbers of transport blocks of transport channels arranged in an order of priority. That is, the address is generated as Address=Address[TrCH_n]& . . . &Address[TrCH_0]. As an initial number, [0 . . . 0] is used, for example. The value of n is determined according to the number of types of transport channels to be multiplexed.

In step 806, a binary representation (Address[TrCH_n]) of the number of transport blocks of the highest priority transport channel TrCH_n is compared with the maximum number of transport blocks of the channel. If the binary representation is larger than the maximum number of transport blocks, the step goes to step 818. If the binary representation is not larger than the maximum number of transport blocks, the step goes to step 808.

In steps 806-812, the same procedure is repeated except that bit positions for comparison are different.

In step 808, a binary representation (Address[TrCH_n-1]) of the number of transport blocks of the secondary highest priority transport channel TrCH_n-1 is compared with the maximum number of transport blocks of the channel. If the binary representation is not larger than the maximum number of transport blocks, the step goes to step 810.

In step 810, a binary representation (Address[TrCH_1]) of the number of transport blocks of the lower priority transport channel TrCH_1 is compared with the maximum number of transport blocks of the channel. If the binary representation is not larger than the maximum number of transport blocks, the step goes to step 812.

In step 812, a binary representation (Address[TrCH_0]) of the number of transport blocks of the lowest priority transport channel TrCH_0 is compared with the maximum number of transport blocks of the channel. If the binary representation is not larger than the maximum number of transport blocks, the step goes to step 814.

In step 814, the value of the address (Address) is registered in the table of FIG. 7A. In step 816, the value of the address is incremented by 1 and the step goes to the step 818.

In step 818, it is checked whether all addresses have been investigated. If so, the step goes to step 820 and the process ends. If not, the step goes to step 806, and the same procedure is repeated.

If the binary representation of the number of transport blocks is larger than the maximum number of transport blocks in step 808, the step moves to the step 819.

In step 819, a carry of the value of the address is performed. More specifically, each number from Address [TrCH_n-1] to Address[TrCH_0] is set to "0", and the Address[TrCH_n] is incremented by 1. Then, the process returns to the step 806, and the above-described procedure is repeated. The process of carry is also performed in each comparison step when the result of the comparison is negative. For example, in step 810, if the binary representation of the number of the transport blocks is larger than the maximum number of transport blocks, the process proceeds to the step 821. In step 821, each number of Address [TrCH_1] and Address[TrCH_0] is set to "0", and the Address[TrCH_2] is incremented by 1. Then, the process goes to the step 806, the above-described procedure is repeated. In step 812, if the binary representation of the number of the transport blocks is larger than the maximum number of transport blocks, the process proceeds to step 823. In step 823, each number of Address[TrCH_0] is set to "0", and the Address[TrCH_1] is incremented by 1. Then, the process goes to the step 806, the above-described procedure is repeated.

By performing the above-mentioned operations, generation of unnecessary addresses is prevented, so that it can be avoided that the TFC list table may include unnecessary addresses. For example, the addresses corresponding to the line numbers 12 and 13 in FIG. 7A are not consecutive. If the address was incremented one by one to obtain the address of line 13 from the address of line 12, following addresses would be generated:

001011 (line number 12)
001100
001101
001110
001111
010000 (line number 13).

However, the four addresses between the line numbers 12 and 13 mean sending three transport blocks of TrCH_C ("11" that is a connection of the third bit and the fourth bit from the most significant bit means three blocks.) But, such combination that includes such number of transport blocks cannot be adopted as combination for transmission. Similar situation may occur between the line numbers 24 and 25. By providing steps 819, 821 and 823, only necessary addresses can be effectively generated by jumping over the unnecessary addresses.

Figure 9:
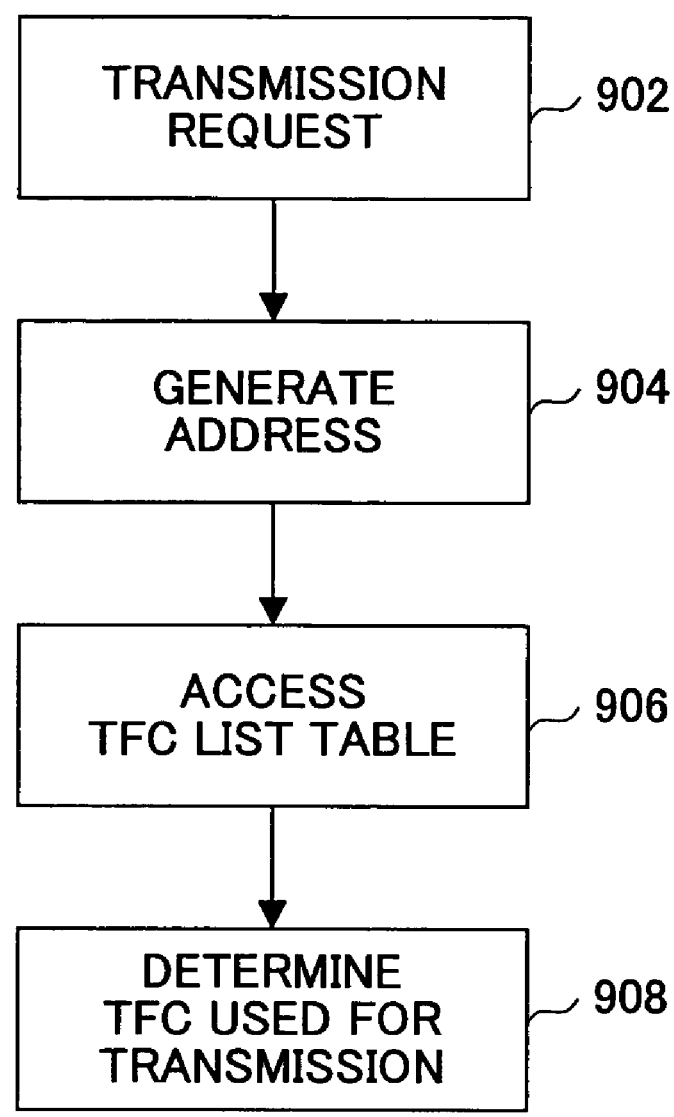
FIG. 9 is a flowchart for selecting a combination of transport blocks of transport channels according to an embodiment of the present invention.

FIG. 9 is a flowchart for selecting a combination of transport blocks of transport channels according to an embodiment of the present invention. As shown in the flowchart, transport blocks of transport channels to be transmitted to the node B are stored in the transmission buffer in the RNC and a transmission request is occurred in step 902.

The address generation part 502 shown in FIG. 5 generates the address in step 904. The TFC list table 410 shown in FIG. 4 is accessed on the basis of the generated address, and information of a combination (TFC) corresponding to the address is extracted in step 906. In step 908, the TFC is determined as a combination used as actual transmission.

After that, transport blocks are extracted from the transport buffer 404 according to the combination, and the transport blocks are sent to the node B from the transmission part 408. When any transport block remains in the transmission buffer 404, the address is generated again in step 904, and the similar procedure is repeated until all transport blocks are transmitted.

FIG. 10 shows an operation example for transmitting transport blocks of transport channels according to an embodiment of the present invention. In this example, it is assumed that there exists four types of transport channels and each maximum number of transport blocks and priorities are set as shown in FIG. 6. As shown in a line indicating buffer amount in "first transmission", the transmission buffer part 404 receives via the receiving part 402 from upper elements three transport blocks, three transport blocks, three transport blocks and two transport blocks for TrCH_A, B, C and D respectively, and the blocks are stored in the transmission buffer part 404. In the figure "Dec" represents decimal representation. The determination part 506 in the address generation part 502 compares the buffered amount and the maximum number of transport blocks for each channel, and the determination part 506 outputs smaller one for each channel. In this example, since the maximum numbers of transport blocks are 2, 2, 1 and 1 respectively for the channels, the output values are 2, 2, 1 and 1 in decimal which are 10, 10, 1 and 1 in binary. An address "101011" is obtained by connecting these values. The selection control part 406 extracts information corresponding to the obtained address from the TFC list table 410 via the access control part 504 so as to obtain the TFC number 5. The numbers of transport blocks of this combination are 2, 2, 1 and 1 in decimal representation.

As shown in buffered amounts in "second transmission", after the first transmission is completed, one block, one block, two blocks and one block are remained for the channels respectively in the transmission buffer. In the same way as the first transmission, each of the numbers of blocks and corresponding maximum number of transport blocks are compared and each smaller one is selected. As a result, 1, 1, 1 and 1 are obtained in decimal representation, which are 01, 01, 1 and 1 in binary representation. An address of "010111" is obtained by connecting these values. By extracting information corresponding to the address from the TFC list table 410, a TFC number 4 is obtained. The numbers of transport blocks according to this combination are 1, 1, 1 and 1 in decimal representation.

As shown in buffer amounts in "third transmission", after the second transmission is completed, only one block of TrCH_C remains in the transmission buffer. In the same way as the first transmission, the number of the block and corresponding maximum number of transport blocks are compared and smaller one is selected. As a result, 0, 0, 1 and 0 are obtained in decimal representation, which are 00, 00, 1 and 0 in binary representation. An address of "000010" is obtained by connecting these values. By extracting information corresponding to the address from the TFC list table 410, a TFC number 1 is obtained. The numbers of transport blocks according to this combination are 0, 0, 1 and 0 in decimal representation. Accordingly, all transport blocks in the transmission buffer can be rapidly transmitted.

Figure 11:
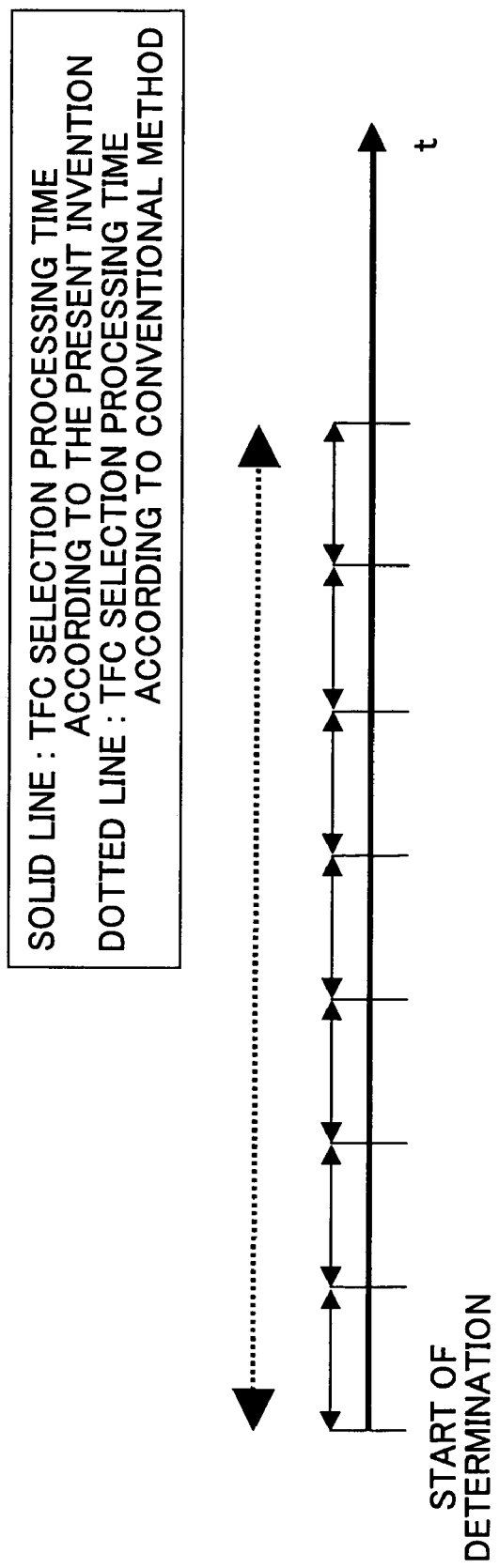
FIG. 11 schematically shows processing time for selecting TFC.

FIG. 11 schematically shows processing time for selecting the combinations of the transport channels. A line with an arrow pointing the right side of the figure indicates time axis. The left end of the time axis indicates a starting point of processing of TFC selection. Each of the seven periods on the time axis indicates a processing time for one combination. In the present embodiment, one period of time includes a time for address generation and a time for accessing the TFC list table 410. According to the conventional method, one period of time includes a time for accessing the TFC list table, a time for determining whether transmission is available by a tentatively selected combination, and a time for comparing transmission efficiencies of new and old TFCs. Although processing performed in one period of time is different between the present embodiment and the conventional method, it is assumed that these are the same for the same of simplicity of description. According to the conventional method, the TFC cannot be determined unless all of the seven combinations (TFC numbers 0-6) are examined. Thus, as shown in a dotted line in the figure, transport blocks are transmitted to the node B once after a period of time including the seven periods elapses. On the other hand, according to the present embodiment, a TFC is determined in one period. Therefore, the transport blocks can be transmitted seven times according to the present embodiment while transport blocks are transmitted only once according to the conventional example.

As mentioned above, according to the present embodiment, a proper TFC can be determined rapidly. In the TFC list table 410, combinations of transport blocks of transport channels to be used in actual transmission are associated with addresses the number of which addresses is larger than the number of the predetermined combinations. In addition, the number of addresses covers all combinations that do not exceed each maximum number of transport blocks of the transport channels. Therefore, an optimal TFC can be selected rapidly and reliably for various combinations of transport blocks of transport channels waiting to be transmitted to the node B. Each address generated by the address generation part indicates numbers of transport blocks of transport channels that are arranged in the order of transmission priority. Therefore, the TFC list table can be generated easily.

The present invention is not limited to the specifically disclosed embodiments, and variations and modifications may be made without departing from the scope of the invention.

The present application contains subject matter related to Japanese patent application No.2003-420079, filed in the JPO on Dec. 17, 2003, the entire contents of which being incorporated herein by reference.

What is claimed is:

1. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, wherein the information stored in the storage includes addresses and predetermined combinations corresponding to the addresses, wherein each of the predetermined combination is one to be used for actually transmitting transport blocks, and the number of the addresses is greater than the number of types of the predetermined combinations.

2. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, wherein the information stored in the storage covers all combinations each of which is a combination of numbers of transport blocks for each transport channel, wherein each of the numbers does not exceed the corresponding maximum number of transport blocks.

3. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, wherein the address generated by the address generation part indicates numbers of transport blocks which numbers are arranged in an order of transmission priority of transport channels.

4. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, wherein the address generated by the address generation part includes a smaller number of transport blocks between a number of transport blocks of a transport channel stored in the transmission buffer and the maximum number of transport blocks of the transport channel.

5. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, wherein a bit width of the address generated by the address generation part corresponds to a total sum of numbers of bits each of which numbers is necessary for representing the maximum number of transport blocks of the corresponding transport channel.

6. A transport channel selecting apparatus comprising:
a storage for storing information on combinations of transport blocks of transport channels to be transmitted to a radio base station;
a transmission buffer for storing transport blocks of the transport channels;
an address generation part for generating an address by using numbers of the transport blocks stored in the transmission buffer for each transport channel;
an extraction part for extracting, from the storage, information on a combination of transport blocks of transport channels corresponding to the address; and
a selection part for selecting transport blocks from the transmission buffer according to the combination indicated by the extracted information, the address generation part includes;
a determination part for determining a smaller number between a number of transport blocks to be transmitted and the corresponding maximum number of transport blocks for each transport channel; and
a connection part for generating the address by connecting the numbers each determined by the determination part.

* * * * *